L. G. COPEMAN.
GREASE CUP.
APPLICATION FILED APR. 2, 1917.

1,269,159.

Patented June 11, 1918.

INVENTOR
LLOYD G. COPEMAN.
BY Raymond A. Parker
ATTORNEY

UNITED STATES PATENT OFFICE.

LLOYD G. COPEMAN, OF FLINT, MICHIGAN.

GREASE-CUP.

1,269,159.

Specification of Letters Patent.  Patented June 11, 1918.

Application filed April 2, 1917. Serial No. 159,137.

*To all whom it may concern:*

Be it known that I, LLOYD G. COPEMAN, a citizen of the United States, residing at Flint, county of Genesee, State of Michigan, have invented a certain new and useful Improvement in Grease-Cups, and declare the following to be a full, clear, and exact description of the same, such as will enable others skilled in the art to which it pertains to make and use the same, reference being had to the accompanying drawings, which form a part of this specification.

This invention relates to grease-cup lubrication, and has for its object a grease-capsule especially designed to work with an abstracting plunger. In my prior Patent #1,190,382, I describe and claim a grease-capsule in combination with a plunger adapted to pick up the grease-capsule. The present capsule is designed to secure absolute certainty of the plunger in picking the capsule up.

In the drawings,—

Figures 1, 2:
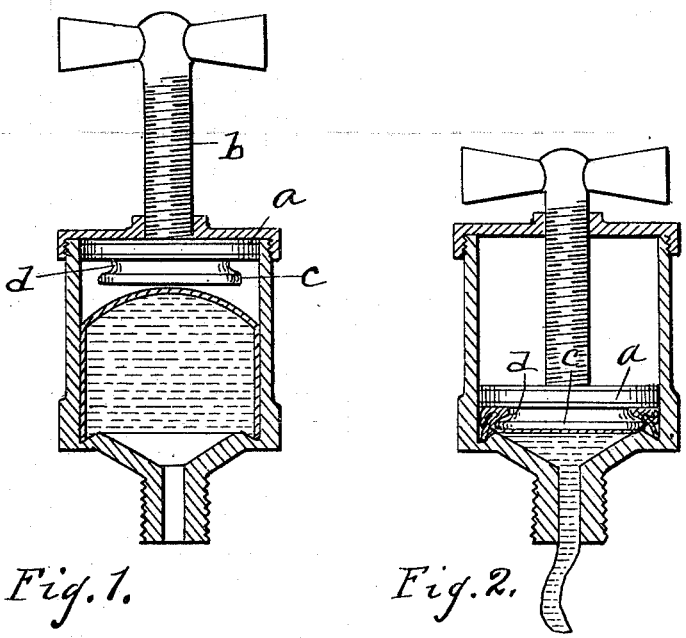
Figure 1 is a vertical section of the grease-cup showing the capsule in place before it is collapsed.
Fig. 2 is a similar section showing the capsule after it is collapsed.
Figures 3, 4:
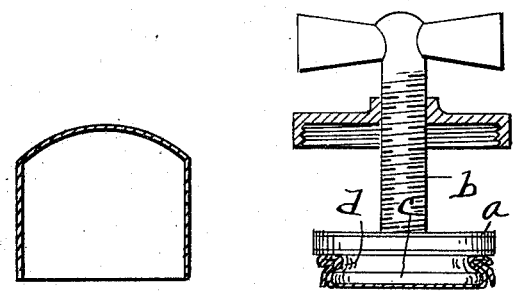
Fig. 3 shows the capsule picked up by the plunger.
Fig. 4 shows a section of the capsule.
Figure 5:
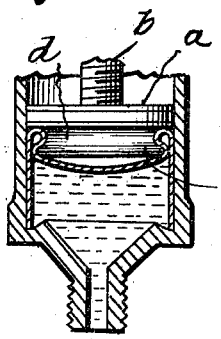
Fig. 5 shows the tendency of the domed capsule in collapsing.

I employ a plunger $a$ provided with a threaded stem $b$ which is threaded into the cap of the grease-cup. This plunger $a$ is provided with a large portion which can be furnished with a suitable gasket to prevent the escape of the lubricant behind the plunger, and it is further provided with a reduced portion $c$ which forms an annular groove $d$. This much of the construction is old and is shown in my prior patent. However, in the prior construction, although in a great percentage of the cases the plunger will pick up the capsule, it is not absolutely certain to pick it up. The substance out of which the capsule is made will not always be driven up into the annula groove $d$, but by the use of a domed capsul or one whose closed end wall is of substan tially greater area than the cross section o the capsule. This allows the reduced sec tion of the plunger to get in beyond the sid walls of the capsules before the pullin stress on the head of the capsule tends t curl the top of the cylinder portion over int the annular groove. This is well shown i Fig. 5. This inevitably draws the capsul substance into the groove $d$, while with flat top sometimes the top of the cylinde portion of the capsule will crush inwar or fold down with the head and not get int the groove.

I have found that a gelatin capsule or capsule made of similar material, worl very well in this connection, as will also paper capsule. Of course, I do not wish t be limited to a capsule of any particula material except in so far as limited in tl claims.

What I claim is:

1. A grease-cup provided with a plung or follower, and a domed capsule containe therein, the said plunger or follower beir provided with a recess into which the dome capsule material is driven in collapsing tl capsule.

2. The combination of a grease-cup, follower provided with a reduced porti forming an annular groove, and a dom capsule contained in said grease-cup, tl material in said capsule being forced in and engaging the groove in collapsing tl capsule.

3. A grease-cup provided with a plung or follower having an annular groove and capsule whose closed end in contact wi the plunger is shaped to have a great area than the cross section, the material said capsule being forced into and engagi the groove in collapsing the capsule.

In testimony whereof I sign this speci cation.

LLOYD G. COPEMAN.